No. 659,154. Patented Oct. 2, 1900.
E. McGREGOR.
APPARATUS FOR DREDGING EARTH, &c.
(Application filed Feb. 9, 1900.)
(No Model.) 4 Sheets—Sheet 1.
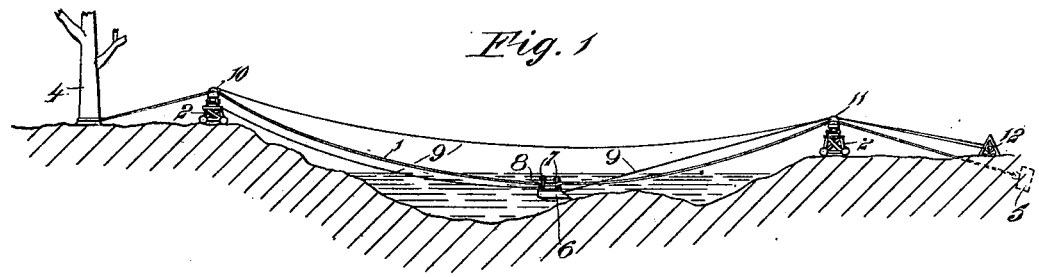
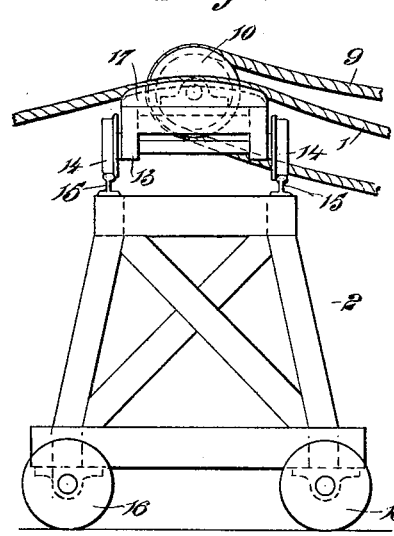
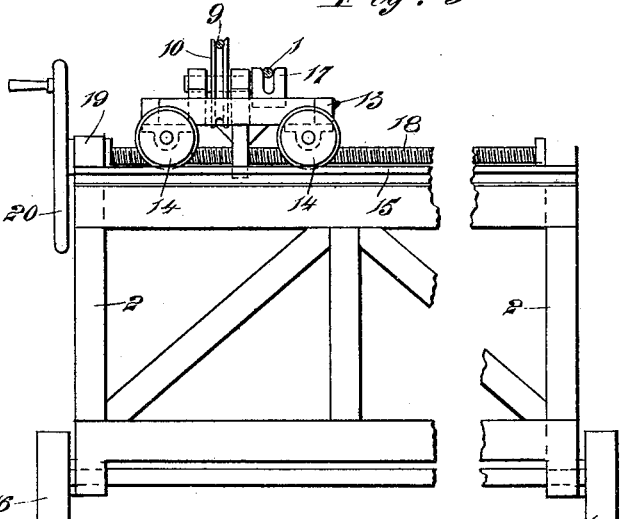
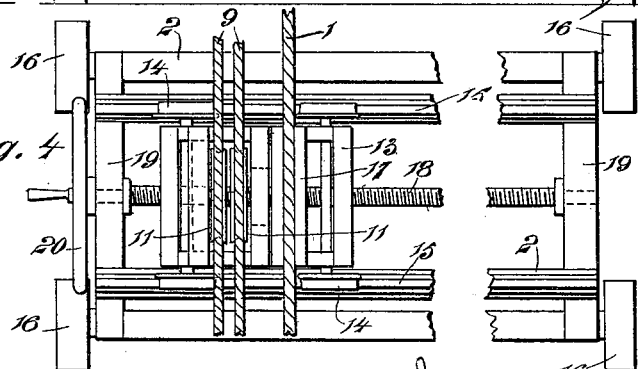

No. 659,154. Patented Oct. 2, 1900.
E. McGREGOR.
APPARATUS FOR DREDGING EARTH, &c.
(Application filed Feb. 9, 1900.)
(No Model.) 4 Sheets—Sheet 2.
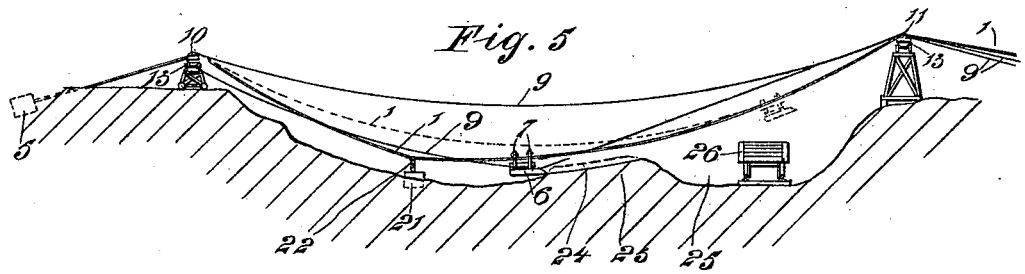
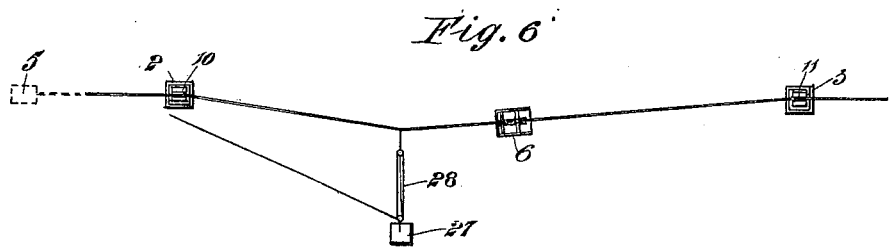
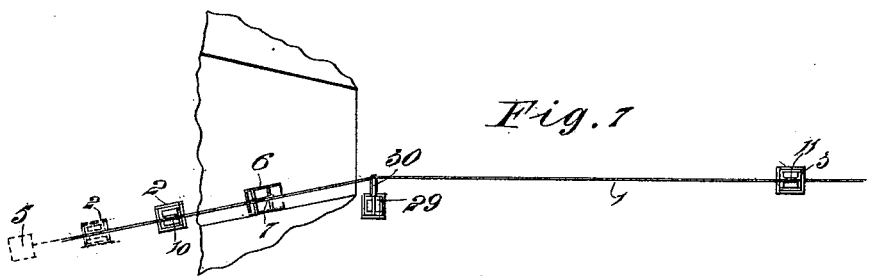
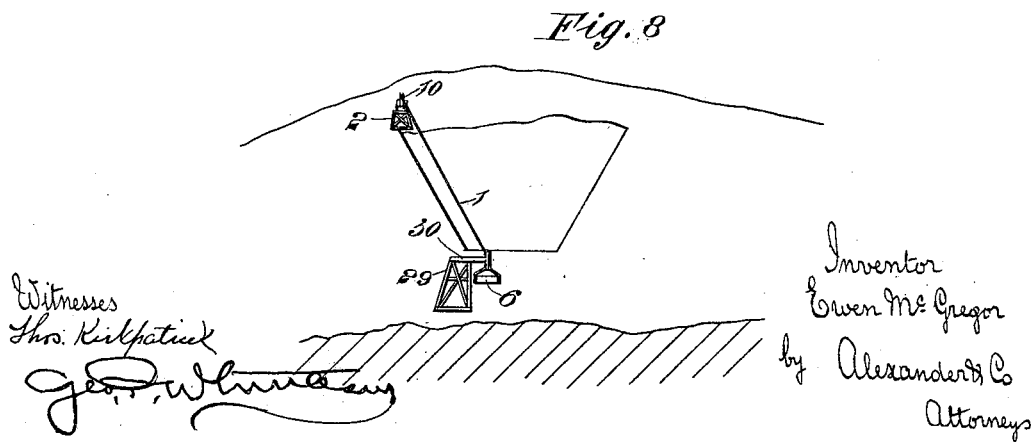
Witnesses
Thos. Kilpatrick
Inventor
Ewen McGregor
by Alexander & Co
Attorneys No. 659,154. Patented Oct. 2, 1900.
E. McGREGOR.
APPARATUS FOR DREDGING EARTH, &c.
(Application filed Feb. 9, 1900.)
(No Model.) 4 Sheets—Sheet 3.
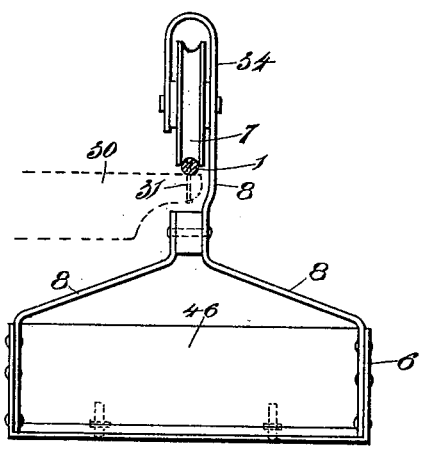
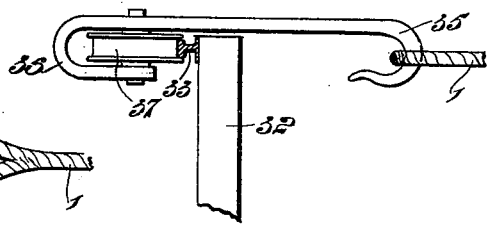
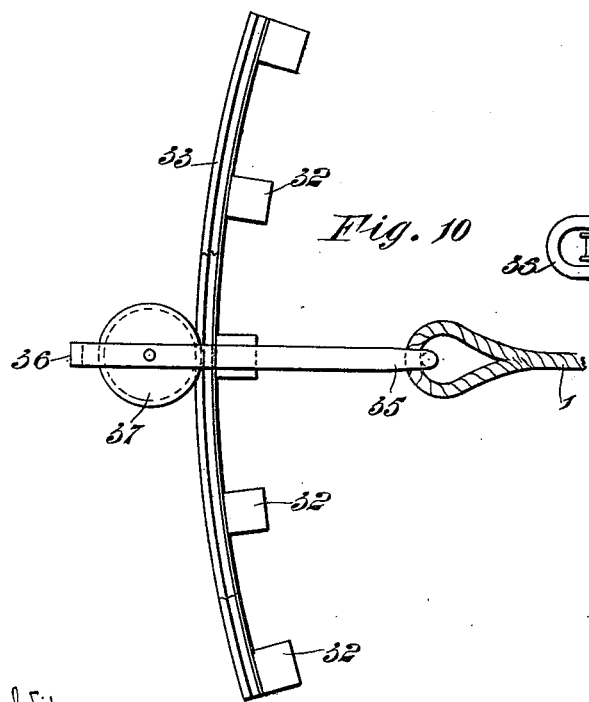

No. 659,154. Patented Oct. 2, 1900.
E. McGREGOR.
APPARATUS FOR DREDGING EARTH, &c.
(Application filed Feb. 9, 1900.)
(No Model.) 4 Sheets—Sheet 4.
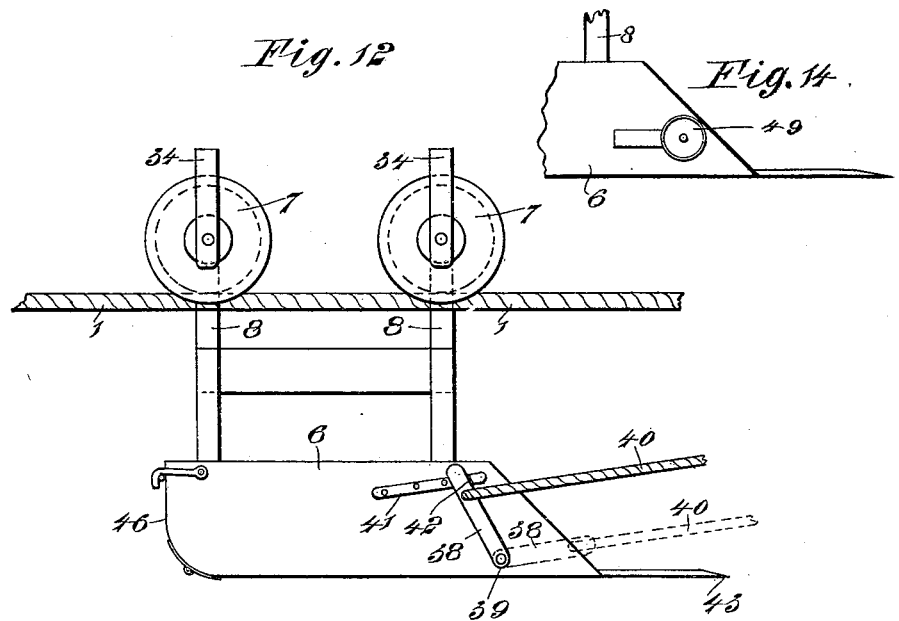
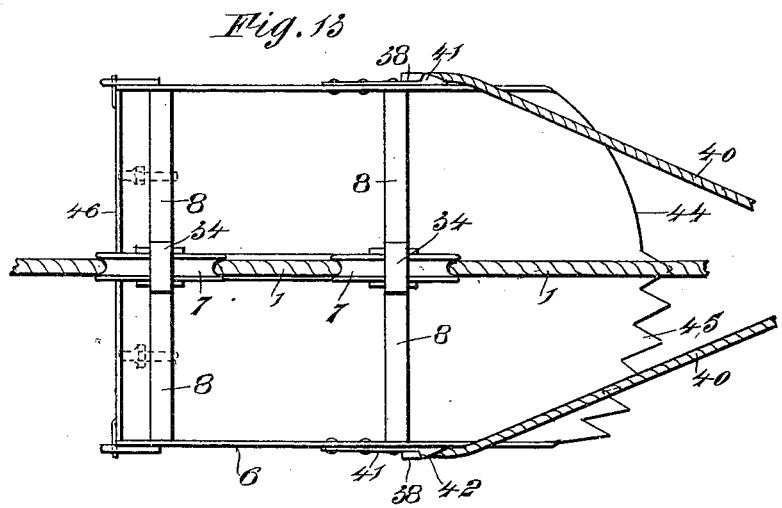
Witnesses
Thos. Kirkpatrick
Inventor
Ewen McGregor
by Alexander & Co.
Attorneys

UNITED STATES PATENT OFFICE.

EWEN McGREGOR, OF MANGAONOHO, NEW ZEALAND.

APPARATUS FOR DREDGING EARTH, &c.

SPECIFICATION forming part of Letters Patent No. 659,154, dated October 2, 1900.

Application filed February 9, 1900. Serial No. 4,644. (No model.)

*To all whom it may concern:*

Be it known that I, EWEN McGREGOR, a subject of the Queen of Great Britain, residing at Mangaonoho, in the Colony of New Zealand, have invented an Improved Apparatus for Excavating or Dredging Earth and Similar Operations, of which the following is a specification.

The object of this invention is to provide an inexpensive and simple apparatus for excavating earth and conveying the same from one position to another, dredging earth from the bottom of rivers or other water, and for operations of a kindred nature.

The apparatus comprises a carrying-rope, preferably of wire, stretched from one support to another and over the positions from and to which the earth is to be removed. The ends of the rope are secured to trees or where these are not available to anchors or weights sunk into the ground at some distance beyond the supports. Upon this carrying-rope I mount a scoop provided with a cutting edge and pulleys to reduce friction and wear and tear. A driving-rope has one end attached to the front of the scoop or the framing of the same, and the other end is similarly attached to the rear of the scoop or its frame. This driving-rope extends forwardly over a pulley mounted upon one of the before-mentioned supports and rearwardly over the other support and then back to the first-mentioned support, and thence the rope passes to a winch or other suitable hauling machinery or engine. The carrying-rope is left with sufficient sag to allow the scoop to come into contact with the earth to be removed. The scoop is hauled backward and forward over the earth to be removed in its forward progress, taking in a quantity of earth and conveying it over the place where it is to be deposited. The hauling-rope is then stopped and the earth emptied out of the scoop by letting down the back of the same or by other suitable means. The motion of the hauling-rope is then reversed and the scoop taken back to be in a position to take up another load of earth. The cycle of operations is then recommenced and continued until the required amount of earth has been removed. The supports usually consist of stagings upon which trolleys are mounted, and these trolleys are capable of lateral movement by means of a screw mounted in journals upon the staging and taking into a nut fixed to the trolley. By this arrangement the carrying-rope may be made to pass over positions upon each side of its original position and the scoop thus brought to remove the earth on each side of the place where the scoop was originally started to work, or I may fix a heavy weight or anchor on either side of the carrying-rope, and by means of blocks and tackle attached to the said weight or anchor and to the carrying-rope I may so deflect the carrying-rope laterally that the scoop will cut the earth to the right or left of its original position, as desired. When carrying ordinary loads the carrying-rope is sufficiently heavy to prevent any great deflection, and thus make it difficult to haul the scoop up the incline of the rope near the support; but when heavy loads are transported I use a heavy weight or anchor and blocks and tackle attached to this weight and the carrying-rope, and I so deflect the carrying-rope in a vertical plane and at the rear of the scoop that the incline up to the support is not inordinate. Further, by this means the earth may be cut away at a position nearer to one or the other of the supports, as desired. Again, if it is desired to make a cutting in a hill so that the sides have a slope I place a third or middle support for the carrying-rope near the foot of the proposed cutting and so that the pulleys of the scoop may pass over the said support. The support at the top of the proposed cutting is so placed that an angle is formed in the carrying-rope at the third support. The scoop in descending from the support at the top of the cutting to the third support will cut the earth in such a manner as to leave the finished cutting with sloping sides, which may be varied at will by moving the supports laterally or longitudinally, as required. Instead of using a trolley upon a staging for a support I may employ a fixed fence or barricade comprising vertical posts sunk into the ground and arranged in a curve having the opposite support as a center. Near the top and at the back of this fence I secure a rail, preferably a railway-rail, bent to the curve of the posts. A pulley provided with a hook rides upon this rail, and the end of the carrying-rope is fixed to the hook. By traversing the pulley nearer to one end or other of the fence a fresh direction may be given to the scoop, as desired. Instead of depositing the earth upon the ground trucks, barges, carts, or the like may be employed and the earth deposited in these conveyances and carried away.

When working in hard ground which the ordinary cutting edge of the scoop will not enter, I bevel the front edge of the scoop, so that it will cut its way beneath the surface, and the earth is then readily gathered by the scoop. A guide wheel or wheels may be mounted at the front of the scoop to prevent the cutting edge entering too far below the surface of the ground, or I may accomplish this result by means of a releasing apparatus whereby the pull of the hauling-rope in normal conditions is taken from near the top of the scoop; but when the strain on the hauling-rope becomes excessive the releasing apparatus comes into operation and the pull is transferred to near the bottom of the scoop, which at once rises out of the ground.

The form of the scoop and its cutting edge may be varied to suit the nature of the material to be removed. Thus a top may be provided on the scoop when required for working under water, and especially in swiftly-running water, to prevent the material being washed out of the scoop.

The apparatus is applicable for use on a sea-coast by anchoring a buoy or small vessel beyond the position where the dredging is to be done and by anchoring the end of the carrying-rope farther out than the buoy or small vessel. The other end of the carrying-rope is secured to a tree or anchor on shore. The buoy or small vessel forms one of the supports to the carrying-rope, and the operations of hauling are carried on as previously described.

Instead of using one scoop only I may attach two or more together and one behind the other upon the same carrying-rope, or where a large scoop is employed I mount the same on two parallel carrying-ropes.

The accompanying drawings illustrate the invention.

Figure 1 is a general view of the apparatus working in a river-bed. Fig. 2 is an elevation of one of the supports and its trolley. Fig. 3 is an end elevation of the same. Fig. 4 is a plan of the same. Fig. 5 is an elevation and shows a weight employed to deflect the carrying-rope vertically. Fig. 6 is a plan and shows the same used to deflect the carrying-rope laterally. Fig. 7 is a plan showing the arrangement of the apparatus when forming a cutting with inclined sides. Fig. 8 is a front elevation of the same. Fig. 9 is a front view of the scoop. Fig. 10 is a plan of a fence and rail. Fig. 11 is a sectional elevation of the same. Fig. 12 is a side view of a scoop. Fig. 13 is a plan of the same. Fig. 14 shows a modification.

Similar figures of reference indicate similar parts where they occur in the several views.

The carrying-rope 1 is stretched over the supports 2 and 3 and has its ends secured to a tree 4 or a heavy weight 5, sunk into the ground or otherwise anchored. The scoop 6 is mounted upon the rope 1 by its pulleys 7 and hangers 8. The hauling-rope 9 has one end attached to the front of the scoop or its frame and the other end to the back of the same. The rearward part of this rope passes around the pulley 10 and thence, with the forward part of the said rope, passes over the pulley 11 to the steam-winch 12, which is supplied with steam from any ordinary boiler. One part of the rope is taken around one of the drums of the winch for hauling the scoop forward and then released. The other part of the rope is then coiled in a reverse direction around the other drum to haul the scoop backward.

Figs. 2, 3, and 4 show details of the supports. 13 is a trolley mounted upon wheels 14 upon rails 15, fixed to the staging 2, which is itself movable on wheels 16. The pulley 10 is mounted revolubly upon the trolley 13, and the hauling-rope 9 passes around the pulley 10.

Fig. 4 shows two pulleys 11, which are provided upon the staging near the winch 12 to guide the separate parts of the hauling-rope. A cradle 17 is grooved and curved, as shown, to form a convenient bed and supports for the carrying-rope.

Figs. 3 and 4 show a screw 18, mounted on a support 2 in bearings 19 and provided with an operating-wheel 20 for traversing the trolley 13 backward or forward upon the support, as required.

Fig. 5 shows a heavy weight 21, which, with the block and tackle 22, is used for vertically deflecting the carrying-rope 1 from the original position shown on Fig. 1 and by dotted lines on said Fig. 5. The mound of earth 23 will be cut down to the dotted lines 24 when the rope 1 is in the position shown by Fig. 1; but by means of the weight 21 and tackle 22 the said rope will be so deflected that the scoop will cut still lower down. By slackening the rope 1 and tightening the tackle 22 the scoop may be made to cut still deeper and at a position nearer to the weight and tackle. The earth taken up by the scoop may be deposited in the hollow 25 or shot into the trucks 26, or by moving the support nearer the winch the earth may be deposited at the foot of the support.

Fig. 6 shows a heavy weight 27, which, with the tackle 28, is used to deflect the rope laterally, so that the scoop may be made to work in fresh ground to the right or left of its original position.

On Figs. 7 and 8 a third support 29 is shown; also, the carrying-rope forming an angle at this support. The bar 30 at the top and upon which the carrying-rope immediately rests is shown on a larger scale by dotted lines on Fig. 9. The rope rests in a slight groove and is fixed to the bar by a bolt 31. The support at the top of the cutting may be moved backward on its wheels 16 (see Fig. 2) as the work progresses to cut farther into the hill and extend the length of the cutting. A second position is shown by the dotted lines on Fig. 7. Fig. 9 shows the hangers 8, shaped to pass by the bar 30. The pulleys 7 are pivoted in forks 34 of the hangers, as shown.

On Figs. 10 and 11 an alternative form of support is shown, and comprises a fence made of posts 32, sunk into the ground, and a railway-rail 33, arranged in a curve, having the opposite support as a center. A hook 35 extends over the posts and is bent into a fork 36 to receive the pulley 37, which is capable of running on the rail 33. The carrying-rope 1 is attached to the hook 35, and by moving the pulley 37, as required, the scoop may be made to work on either side of its original position.

Figs. 12 and 13 show a releasing-gear in position on a truck, the full lines on Fig. 12 illustrating the position of the gear under normal conditions and the dotted lines showing the same after being released by some unusual strain. Of this gear, 38 represents strong springs pivoted on pins 39. 40 is a bridle or sling extending from the springs to the carrying-rope, which is not shown on this view. 41 is a catch, the working face 42 of which is set at an angle of more than ninety degrees to the body of the catch, as shown in the plan Fig. 13. This angle will vary slightly with the size of the scoop and the material in which it is to work. In ordinary circumstances the spring 38 will remain engaged with the catch 41, and the pull of the hauling-rope will be upon the top of the scoop, tending to force the cutting edge 43 into the ground; but under an abnormal strain the spring will rise on the inclined face 42 and will assume the position shown by dotted lines, when the pull will be transferred from the top to the bottom of the scoop and will raise the cutting edge out of the ground. Figs. 12 and 13 also show the form of cutting edge suitable for working in hard ground. The top of the plate forming the bottom of the scoop is beveled, as shown on Fig. 12, and the said edge may be curved, as shown at 44 in plan Fig. 13, or the said edge may be furnished with teeth 45, according to the nature of the material to be excavated.

The back of the scoop is rounded, as shown on Fig. 12, so that it may easily ride over the ground on its backward journey.

Figs. 9, 12, and 13 show the hinged back 46 of the scoop.

Fig. 14 shows the scoop provided with rollers 49 to prevent the cutting edge from entering too far below the surface of the ground.

Instead of carrying the hauling-rope around a pulley 10 I may fix one end of a length of rope to the trolley and attach a snatch-block at the other end of such rope, and I may pass the hauling-rope through the snatch-block. Such an arrangement would be useful when it is necessary to have the support and its trolley in such a position that the hauling-rope could not be conveniently carried to the support.

Having now particularly described and ascertained the nature of my said invention and in what manner the same is to be performed, I declare that what I claim is—

1. An apparatus for excavating or dredging earth and similar operations comprising a carrying-rope anchored on each side of the material to be removed supports for the carrying-rope means on the supports for traversing the carrying-rope laterally, a scoop provided with rollers and mounted upon the carrying-rope and a cutting edge on the scoop and a hauling-rope and hauling machinery substantially as set forth.

2. In an apparatus for excavating or dredging earth and similar operations, the combination with carrying and hauling ropes, of a support for the same, provided with a track transverse to the line of said ropes, a trolley mounted to move on said track, pulleys or other supports on said trolley for said ropes, and means for moving said trolley.

3. An apparatus for excavating or dredging earth and similar operations comprising a carrying-rope anchored on each side of the material to be removed, supports for the carrying-rope, a scoop provided with rollers and mounted on the carrying-rope, a cutting edge on the scoop a hauling-rope and hauling machinery and a releasing-device whereby the pull of the hauling-rope is transferred from the top to the bottom of the scoop, substantially as set forth.

4. In apparatus such as described herein, a scoop provided with a releasing device comprising a spring pivoted to the scoop and to which the hauling-rope is attached, and a catch, substantially as set forth.

5. In apparatus such as described herein, a scoop provided with a releasing device comprising a spring pivoted to the scoop and to which the hauling-rope is attached, and a catch having its holding edge at an obtuse angle to the body of the catch, substantially as set forth.

6. An apparatus for excavating or dredging earth and similar operations comprising a carrying-rope anchored on each side of the material to be removed to form a cutting with sloping sides, supports near the end of and for the carrying-rope, a third support at the foot of the proposed cutting and to which the carrying-rope is fastened so that it forms an angle in the carrying-rope, a scoop provided with rollers and mounted upon the carrying-rope, a cutting edge on the scoop, and a hauling-rope and hauling machinery substantially as set forth.

7. An apparatus for excavating or dredging earth and similar operations comprising a carrying-rope anchored on each side of the material to be removed, supports for the carrying-rope, a scoop provided with rollers, and mounted upon the carrying-rope, a hauling-rope and hauling machinery, and means for vertically deflecting the carrying-rope, substantially as set forth.

8. An apparatus for excavating or dredging earth and similar operations comprising a carrying-rope anchored on each side of the material to be removed, supports for the carrying-rope, a scoop provided with rollers and mounted upon the carrying-rope, a hauling-rope and hauling machinery, and means for laterally deflecting the carrying-rope, substantially as set forth.

In witness whereof I have hereunto set my hand in presence of two witnesses.

EWEN McGREGOR.

Witnesses:
 IRY W. BARRAUD,
 B. E. HUGHES.